United States Patent
Fukaya et al.

(10) Patent No.: US 6,305,841 B1
(45) Date of Patent: Oct. 23, 2001

(54) TEMPERATURE SENSOR WITH THERMISTOR HOUSED IN BLOCKED SPACE HAVING VENTILATION

(75) Inventors: Matsuo Fukaya, Obu; Junichi Nagai, Gifu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/397,862

(22) Filed: Sep. 17, 1999

(30) Foreign Application Priority Data

Sep. 29, 1998 (JP) .................................................. 10-276090

(51) Int. Cl.⁷ ....................................................... G01K 7/00
(52) U.S. Cl. ............................................. 374/185; 374/208
(58) Field of Search ................................ 374/183, 185, 374/208; 338/28, 29, 229, 238

(56) References Cited

U.S. PATENT DOCUMENTS

| | | | | |
|---|---|---|---|---|
| 3,725,837 | * | 4/1973 | Fullager | 338/28 |
| 4,590,669 | * | 5/1986 | Imamura | 29/612 |
| 4,987,749 | * | 1/1991 | Baier | 62/222 |
| 5,959,524 | * | 9/1999 | Wienand et al. | 338/28 |
| 6,130,598 | * | 10/2000 | Katsuki et al. | 338/28 |

FOREIGN PATENT DOCUMENTS

| | | |
|---|---|---|
| 40 21 997 A1 | 1/1991 | (DE) . |
| 0 680 053 A2 | 11/1995 | (EP) . |
| 0027681 * | 3/1977 | (JP) ..................................... 374/183 |
| 9-189618 | 7/1997 | (JP) . |

* cited by examiner

Primary Examiner—Diego Gutierrez
Assistant Examiner—Lydia M. De Jesús
(74) Attorney, Agent, or Firm—Pillsbury Winthrop LLP

(57) ABSTRACT

A temperature sensor includes a thermistor element housed in a metal cap and a mineral insulated cable for acquiring signals from said thermistor element wherein the mineral insulated cable employs a ventilation composition that provides stable thermistor element resistance characteristics. Thermistor element is equipped with thermistor section including an oxide semiconductor, and electrode wires extending from thermistor section for acquisition of thermistor signals, and is arranged on the end of mineral insulated cable and housed in metal cap. The mineral insulated cable employs a composition in which electrically conducting core wires connected to electrode wires are insulated and held in a metal outer cylinder by insulating powder filled into the outer cylinder. A ventilation quantity of at least $5 \times 10^{-4}$ ml/(MPa sec) is secured within outer cylinder at normal temperature.

11 Claims, 4 Drawing Sheets

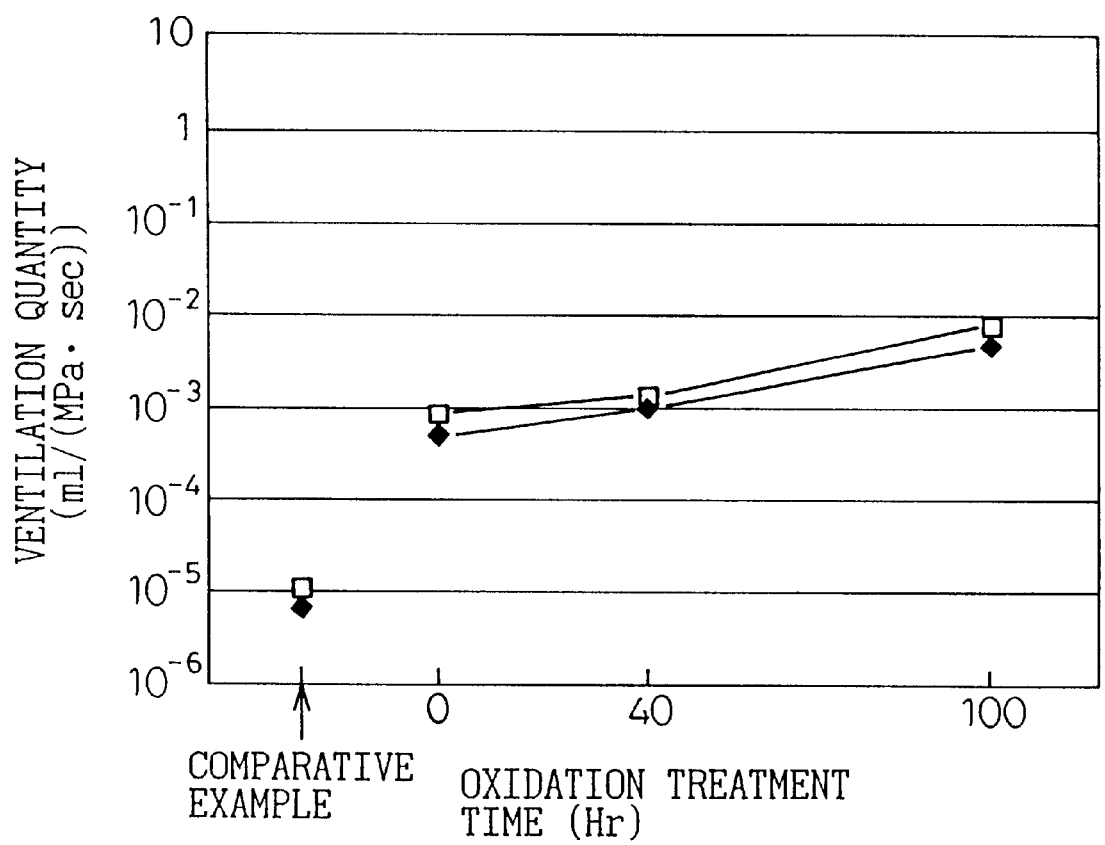

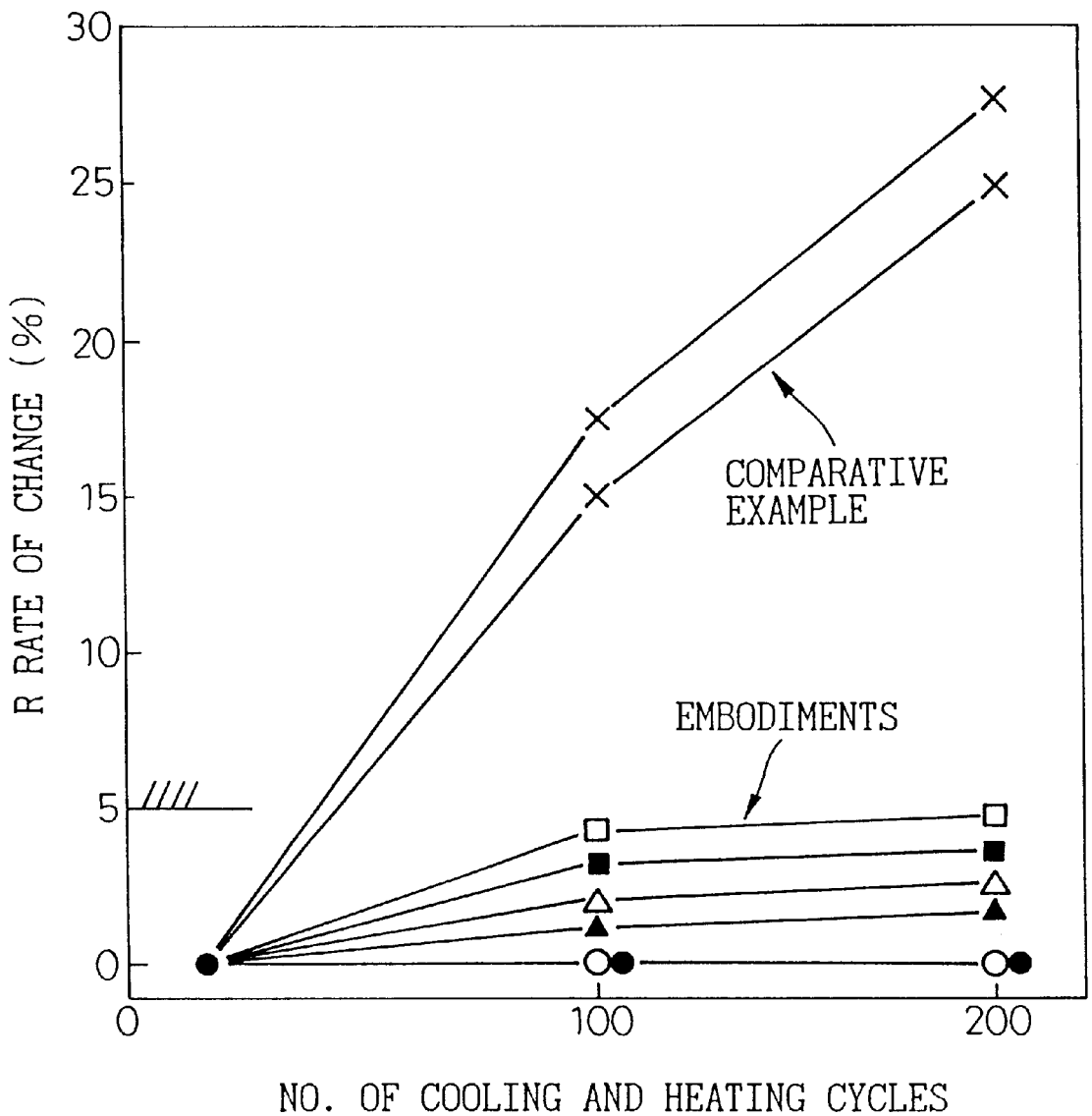

TEMPERATURE SENSOR WITH THERMISTOR HOUSED IN BLOCKED SPACE HAVING VENTILATION

BACKGROUND OF THE INVENTION

1. Field of the Invention

The present invention relates to a temperature sensor incorporating a thermistor element that is used to detect temperature and, more particularly, to a temperature sensor required to have heat resistance up to a temperature of about 1000° C. which is suitable for use in, for example, an exhaust gas temperature sensor that is installed on a catalytic converter, and so forth, of an automobile exhaust system and detects abnormal temperatures or catalyst deterioration and so forth.

2. Description of the Related Art

This type of temperature sensor typically provides a thermistor element, having a certain temperature-resistance characteristic, at the end of a wiring member for the acquisition of thermistor signals. This end section is covered with a bottomed cylindrical metal case resulting in a composition in which the thermistor element is housed in the space formed by the metal case and the wiring member end section.

Normally, by filling insulating powder into a space between a metal outer cylinder and core wires, the composition of the wiring member is such that the core wires are insulated and retained in the outer cylinder, and these core wires are connected to electrode wires provided on the thermistor element.

Since a thermistor material composing the thermistor element is comprised of an oxide semiconductor, the resistance characteristics (temperature-resistance characteristics) of the thermistor section fluctuate according to the oxygen partial pressure of the ambient atmosphere of the thermistor element.

In this type of temperature sensor, since the thermistor element is housed in a metal case, oxidation of a heat-resistant metal occurs at high temperatures (e.g., 700° C. and above), and the oxygen partial pressure of the internal atmosphere decreases. In a harsh reducing atmosphere, a phenomenon occurs in which oxygen is temporarily taken from the oxide semiconductor of the thermistor section, resulting in a disturbance in the above resistance characteristics at high temperatures.

Therefore, it is necessary to provide the thermistor element housed in the metal case with suitable ventilation to stabilize the thermistor characteristics. Here, in the case of a temperature sensor employing a double tube structure in which the periphery of the wiring member is further covered with a metal cylinder, etc. (e.g., that described in FIG. 8 of Japanese Patent No. 2621488), a ventilation pathway can be formed by using the gap between the wiring member and the metal cylinder.

More recent sensors, however, are required to accurately detect temperature over ranges of low temperature variation and perform on-off control for assessment of catalyst deterioration and so forth, thus requiring an even faster response. Consequently, there is a need to make the outer diameter of the temperature-sensitive section smaller to increase the speed of the sensor response. The above-mentioned double tube structure is structurally complex and unsuited for accommodating this need.

On the other hand, in the case of a single tube structure in which the end section of a wiring member provided with a thermistor element is covered only with a bottomed, cylindrical metal case, although it is advantageous to make the outer diameter of the temperature-sensitive section smaller, the ventilation pathway for the thermistor element must then be formed inside the wiring member.

However, as was mentioned above, since the wiring member employs a composition in which the core wires are insulated and held in a metal outer cylinder by insulating powder filled into the outer cylinder, it cannot be expected to provide good ventilation. In addition, when the outer diameter of the temperature-sensitive section is made smaller to increase the response speed, since this requires that the wiring member has a smaller diameter, it becomes difficult to secure ventilation. Therefore, the need arises to clarify the quantity of ventilation required to stabilize the thermistor characteristics.

Therefore, in consideration of the above points, the object of the present invention is to provide a temperature sensor incorporating a thermistor element housed in a metal case and a wiring member for acquisition of signals from said thermistor element, wherein the wiring member employs a ventilation composition that provides stable resistance characteristics of the thermistor element, and to provide a manufacturing process for a temperature sensor incorporating such wiring member composition.

SUMMARY OF THE INVENTION

As a result of earnest studies conducted by the inventors of the present invention and focusing on the quantity of ventilation of the wiring member, it was experimentally determined that, if the said quantity of ventilation was equal to or greater than a prescribed quantity, stable thermistor resistance characteristics are obtained, thereby leading to completion of the present invention.

The present invention provides a temperature sensor equipped with a thermistor element having a thermistor section comprised of a thermistor material, a wiring member comprising electrically conducting core wires coupled to said thermistor element, for acquiring thermistor signals from the thermistor element, insulated and held in a metal outer cylinder, and a cylindrical metal case that houses said thermistor element, has an opening in one end and is closed on the other end, and is joined to said outer cylinder at said opening; wherein said wiring member secures a ventilation quantity in said outer cylinder of at least $5 \times 10^{-4}$ ml/(MPa·sec) at normal temperature.

Accordingly, an amount of outside air based on the above-mentioned prescribed quantity of ventilation can be introduced through the inside of the wiring member into the space in which the thermistor element is housed, formed by the metal case and wiring member, thereby preventing the formation of a harsh reducing atmosphere around the thermistor element. Thus, according to the present invention, a ventilation composition can be realized that provides stable thermistor element resistance characteristics.

The thermistor element is preferably comprised of thermistor section comprised of a thermistor material and electrode wires extending from said thermistor section for acquisition of thermistor signals. In this case, the electrode wires are connected to the core wires.

According to experimental studies conducted by the inventors of the present invention, the above-mentioned prescribed ventilation quantity is preferably secured at $1 \times 10^{-3}$ ml/(MPa·sec) at normal temperature, and more preferably secured at $5 \times 10^{-3}$ ml/(MPa·sec) at normal temperature.

The inventors of the present invention have confirmed that the object of the present invention can be realized provided the above-mentioned ventilation quantity is secured even if the outer diameter of the outer cylinder, namely the outer diameter of the wiring member, is reduced to 3 mm or less and the outer diameter of the outer diameter of the outer cylinder is reduced to 2.5 mm or less.

As one specific wiring member means for achieving the above-mentioned prescribed ventilation quantity, the core wires of the wiring member can be insulated and held on the outer cylinder by filling insulating powder into the outer cylinder between said outer cylinder and core wires, and the outer cylinder can be made to have a coefficient of thermal expansion of $3 \times 10^{-6}$ (/°C.) or more larger than the insulating powder.

As a result, at high temperatures facilitating the formation of a reducing atmosphere, the insulating powder filled into the outer cylinder contracts relative to the outer cylinder, enabling the formation of a gap that allows the above-mentioned prescribed ventilation quantity to be secured between the outer cylinder and insulating powder. More specifically, magnesium oxide can be used for the insulating powder.

In a temperature sensor in which the above-mentioned outer cylinder has a coefficient of thermal expansion that is at least $3 \times 10^{-6}$ (/°C.) larger than that of the insulating powder, the inventors of the present invention determined experimentally that the ventilation quantity is increased by heat treatment of the wiring member. The above-mentioned ventilation quantity can be increased to at least the above-mentioned value by heat treating the wiring member at at least 900° C.

In temperature sensors, the wiring member typically lacks flexibility for bending and so forth as a result of having a metal outer cylinder. Therefore, the wiring between the temperature sensor and external circuitry is normally connected to the external circuitry and so forth using lead wires in which wires are passed through flexible tubes from the wiring member. At this time, the connection between the lead wires and wiring member is protected from the outside by a protective member in order to prevent entry of moisture and dust and to provide protection from external shock and so forth.

Thus, the exchange of air between the section housing the thermistor element and the outside is performed through each of the insides of the wiring member, protective member and lead wire outer tube. In this type of composition, it is preferable to provide the inside of the lead wire outer tube with good ventilation as well.

Therefore, in a composition using the above-mentioned lead wires, it is preferable to make the lead wires such that a plurality of electrically conducting wires are covered with flexible outer tubes.

In the present invention, since the wires in the outer tubes are composed of a plurality of wires for the lead wires, gaps are formed between corresponding wires and between the outer tubes and the wires. The ventilation quantity inside the outer tubes due to the presence of these gaps can be made to be much larger than the prescribed ventilation quantity of the above-mentioned wiring member, thus eliminating any problems with ventilation.

BRIEF DESCRIPTION OF THE DRAWINGS

FIG. 4 is a graph showing the relationship between oxidation treatment time and ventilation quantity in the mineral insulated cable.

FIG. 5 is a graph illustrating the relationship between the number of cooling and heating cycles and the rate of change of resistance of the thermistor element in a temperature sensor when the duration of the oxidation treatment time is changed in the mineral insulated cable.

The following provides an explanation of the present invention through its preferred embodiments with reference to the drawings. In the present embodiment, the temperature sensor of the present invention is explained as being applied to an exhaust temperature sensor installed on an automobile exhaust gas purification device such as a catalytic converter that detects an abnormal temperature or catalyst deterioration. Since this temperature sensor is mainly installed in the exhaust gas pathway of automobile exhaust gas, the temperature sensing section is required to have heat resistance, heat shock resistance, vibration resistance and so forth so as to withstand high temperatures on the order of, for example, 1000° C.

Figure 1:
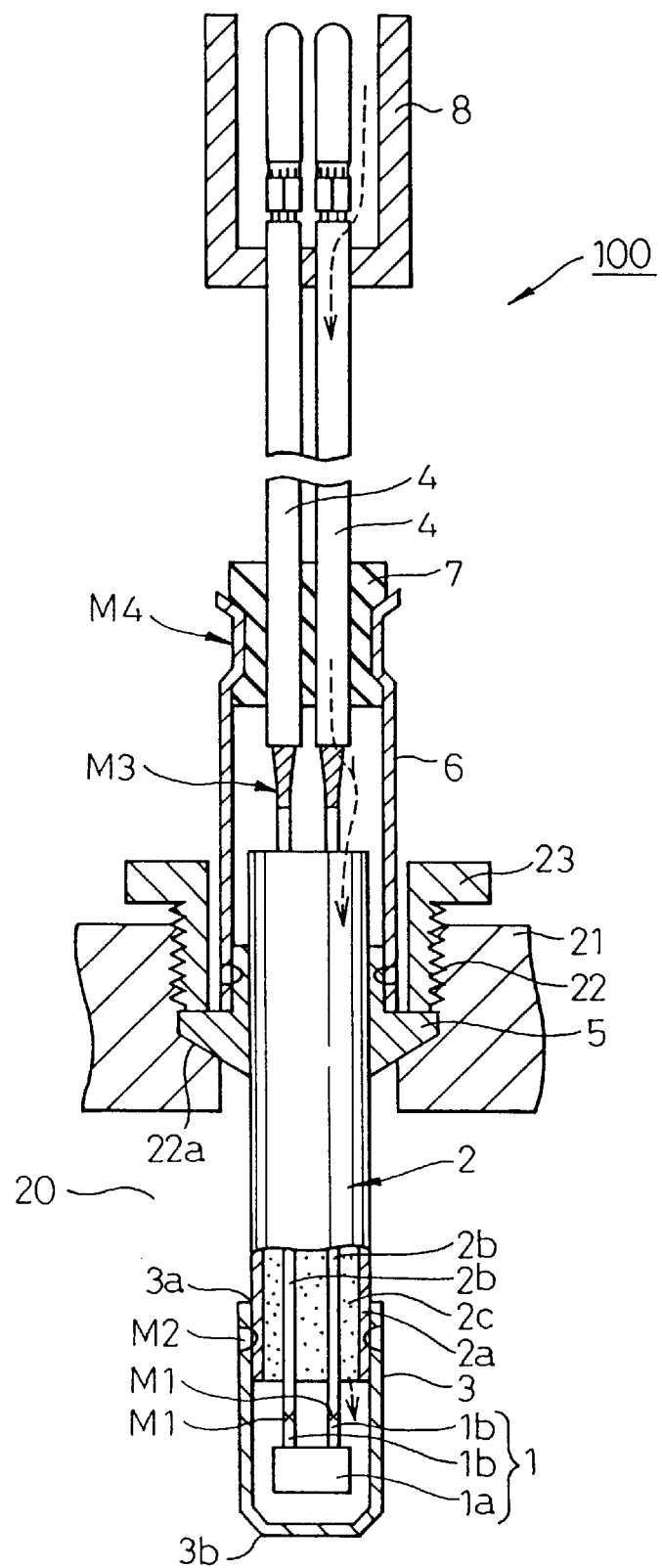
FIG. 1 is a partially cutaway cross-sectional view showing a temperature sensor pertaining to a first embodiment of the present invention.

Thus, heat-resistant material that is able to withstand such temperatures is also used in the temperature sensing section, and a rugged structural design is employed. More recently, more precise exhaust temperature detection has been required by engine control systems, and there is a need for temperature detection having improved response times. FIG. 1 is a partially cutaway cross-sectional view of one embodiment of a temperature sensor of the present invention designed to adequately accommodate these new system applications.

Temperature sensor 100 is broadly composed by being equipped with thermistor element 1, mineral insulated cable (wiring member) 2 for acquiring thermistor signals, metal cap (metal case) 3 that houses thermistor element 1 so that it does not make direct contact with an exhaust gas, lead wires 4 for connecting mineral insulated cable 2 with external circuitry, flange 5 for fixing the sensor to tube wall 21 of the exhaust gas pathway, and sleeve (protective member) 6 that protects the connection between mineral insulated cable 2 and lead wires 4.

In FIG. 1, the inside of exhaust gas pathway 20 through which exhaust gas flows is located below tube wall 21, and the temperature sensing section of temperature sensor 100, which is composed by thermistor element 1 and metal cap 3 that houses it, is inserted and fixed in hole 22 having a threaded hole formed in the tube wall 21 so as to be exposed to the inside of exhaust gas pathway 20.

Here, tapered section 22a is formed in the inner surface of hole 22 nearer to the exhaust gas pathway 20 than to the threaded hole portion. Temperature sensor 100 is therefore fixed in position by pressing on flange 5 with screw 23.

Flange 5 is made of heat-resistant metal (for example, SUS304). It is joined to the outside of mineral insulated cable 2 and has a tapered shape corresponding to tapered section 22a of hole 22. When the sensor is fixed to tube wall 21, in addition to exhaust gas being unable to escape from exhaust gas pathway 20 as a result of flange 5 securely fitting into tapered section 22a, the sensor is supported in hole 22 of tube wall 21.

Next, thermistor element 1 has thermistor section 1a, which is formed by sintering, into a cylindrical shape, a thermistor material having excellent heat resistance composed of an oxide semiconductor such as Mn—Cr, and a pair of electrode wires 1b embedded by shrink-fitting in thermistor section 1a. The pair of electrode wires 1b are for acquiring an output (resistance corresponding to temperature) in the form of thermistor signals from thermistor section 1a, and are made of a wire material such as platinum wire having excellent heat resistance and output characteristics.

The pair of electrode wires 1b are embedded roughly in parallel in the column axial direction of thermistor section 1a at a mutually constant interval (between electrodes), and one end of each wire extends from thermistor section 1a. The extending ends of the pair of electrode wires 1b are each electrically connected by resistance welding or laser welding, etc. at sections M1 indicated with an "x" in FIG. 1 to a pair of core wires 2b of mineral insulated cable (wiring member) 2 for acquiring thermistor signals to the outside.

Figure 2:
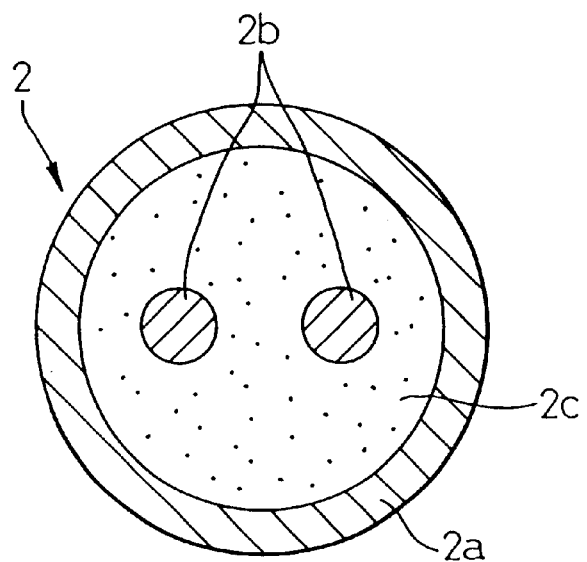
FIG. 2 is a cross-sectional view taken along the radial direction of the mineral insulated cable of the temperature sensor shown in FIG. 1.

A cross-sectional view in the radial direction of mineral insulated cable 2 is shown in FIG. 2. Mineral insulated cable 2 insulates and holds a pair of core wires 2b made of a metal such as stainless steel (SUS310S as an example) inside cylindrical outer cylinder 2a made of a metal such as stainless steel (SUS310S in the example). In the present embodiment, core wires 2b are insulated and held in outer cylinder 2a by filling insulating powder (protective member) 2c composed of MgO, $Al_2O_3$ and so forth between outer cylinder 2a and each core wire 2b inside outer cylinder 2a.

Since this mineral insulated cable 2 is made by repeating drawing and annealing starting from a large diameter material, and is in the narrow diameter state at the time of use, insulating powder 2c is packed at high density, and both core wires 2b are firmly held in place. The outer diameter of outer cylinder 2 (outer diameter of mineral insulated cable 2) is 3 mm or less, and in the example, outer diameter 2a is in the shape of a cylinder having an outer diameter of 2.3 mm, wall thickness of 0.3 mm and length of 60 mm. In addition, each core wire 2b has an outer diameter of, for example, 0.3 mm.

In addition, mineral insulated cable 2 secures a ventilation quantity inside outer cylinder 2a of at least $5\times10^{-4}$ mm/(MPa·sec) at normal temperature when air (for example, industrial air) flows from one end to the other end at a pressure of 5 atm. This prescribed ventilation quantity can be realized by suitably selecting the particle diameter of insulating powder 2c (for example, mean particle diameter: 100 $\mu$m, particle size distribution: 75–150 $\mu$m), filling the insulating powder so that suitable gaps can be formed and not packing the insulating powder more densely than is necessary even after drawing of the mineral insulated cable.

In addition, it is preferable that outer cylinder 2a be composed such that its coefficient of thermal expansion is at least $3\times10^{-6}$ (/°C.) higher than insulating powder 2c in order to realize the above-mentioned prescribed ventilation quantity. In the example, SUS310S is used for the material of outer cylinder 2a and MgO (magnesium oxide) is used for insulating powder 2c, and their respective coefficients of thermal expansion are $16.4\times10^{-6}$/°C. for SUS310S and $13\times10^{-6}$/°C. for MgO over the range from room temperature to 400° C., and $19.5\times10^{-6}$/°C. for SUS310S and $15\times10^{-6}$/°C. for MgO over the range from 400° C. to 1000° C.

In addition, metal cap (metal case) 3 that houses thermistor element 1 is in the shape of a bottomed cylinder made of a heat-resistant metal such as SUS310S, has opening 3a in one end and closed section 3b on the other end, and has an outer diameter of 3 mm. Thus, the temperature sensing section of the present embodiment also has a narrow outer diameter of 3 mm. In the example, the metal cap has a thickness of 0.3 mm and inner diameter of 2.4 mm.

Opening 3a of metal cap 3 overlaps outer cylinder 2a, and both metal cap 3 and outer cylinder 2a are fixed at this overlapping section by circumferential welding by, for example laser welding, of the inner surface of metal cap 3 and the outer surface of outer cylinder 2a (section indicated with reference numeral M2 in FIG. 1). Opening 3a of metal cap 3 is blocked by mineral insulated cable 2, and thermistor element 1 is housed in the space formed in the metal cap 3.

Figure 3:
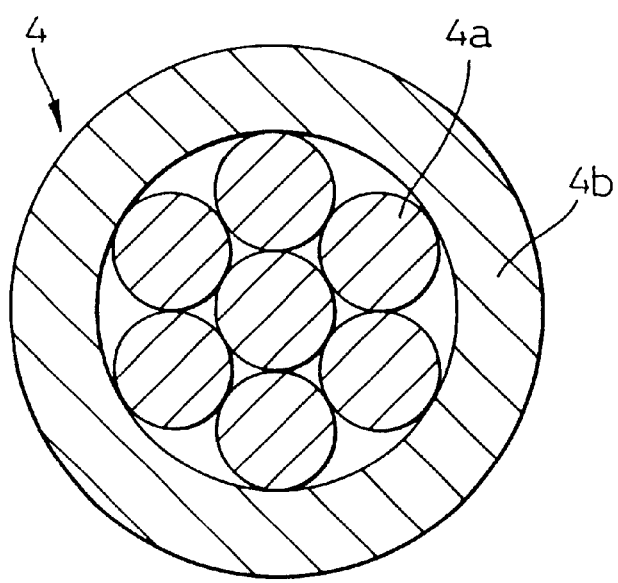
FIG. 3 is a cross-sectional view taken along the radial direction of the lead wires of the temperature sensor shown in FIG. 1.

Next, a pair of lead wires 4 are respectively connected using a connecting method such as a connector or welding to a pair of core wires 2b at a site on the opposite side from the side where thermistor element 1 and electrode wires 1b are connected in mineral insulated cable 2 (section M3 in FIG. 1). A cross-sectional view in the radial direction of lead wire 4 is shown in FIG. 3. This lead wire 4 consists of a plurality of electrically conducting wires 4a covered with flexible outer tube 4b.

In this manner, since wires 4a inside outer tube 4b are composed of a plurality of wires (7 are shown in the example of FIG. 3), a gap is formed as shown in FIG. 3 between each of corresponding wires 4a and between outer tube 4b and wires 4a.

Here, the gaps formed in lead wires 4 are sufficiently larger than the above-mentioned prescribed ventilation quantity inside mineral insulated cable 2 suitably packed with insulating powder 2c.

In addition, wires 4a can be composed of, for example, a metal such as stainless steel, while outer tube 4b can be composed with flexible plastic such as ethylene tetrafluoride plastic. In the example, by twisting together 7 wires having an outer diameter of at least 0.12 mm, each wire does not become unraveled, which together with improving workability, improves the strength of lead wires 4 with respect to bending stress.

The connection with mineral insulated cable 2 (core wires 2b) in a pair of lead wires 4 is protected from the outside by sleeve 6. Sleeve 6 is in the form of a cylinder made of metal such as SUS304, and is provided from the outside of lead wires 4 to the outside of outer cylinder 2a.

Sleeve 6 is fixed around the outside of outer cylinder 2a by welding and so forth to the outer surface of flange 5, and is tightly fastened by means of rubber bushing 7 to prevent the entrance of water, dust and so forth (section M4 in FIG. 1) while also keeping the inside of sleeve 6 airtight. In the present embodiment, a protective member is composed by sleeve 6 and rubber bushing 7.

In addition, coupler 8 is provided on the end opposite the connection with mineral insulated cable 2 (core wires 2b) in a pair of lead wires 4 (lead wire outlet section) for connecting to external circuitry (such as a vehicle ECU) or to a cable extending from external circuitry and so forth.

In temperature sensor 100 having this composition, the output of thermistor element 1 is acquired with a pair of electrode wires 2b, and transferred to external circuitry after being acquired by a sensor external unit by way of lead wires 4 from mineral insulated cable 2.

In addition, in temperature sensor 100, air inside metal cap 3, namely inside the section housing thermistor element 1, expands or contracts due to fluctuations in temperature of the exhaust gas during use. As a result, inside air flows from the gaps of the connecting section of coupler 8 into coupler 8, while outside air flows into coupler 8 from the portion in contact with the outside air in the external circuitry.

Namely, as shown by the broken line arrows in FIG. 1, at a certain time outside air flows into coupler 8, the gaps of lead wires 4, sleeve 6, the section containing insulating powder 2c and thermistor element 1, after which it flows into the section containing thermistor element 1. In addition, at another certain time, the air around thermistor element 1 flows to the outside following the path opposite of that described above.

In this manner, since the present embodiment takes the inside of mineral insulated cable 2, which is the rate-determining section of the above-mentioned air flow, to be the above-mentioned prescribed ventilation quantity, the air is effectively interchanged in the section containing thermistor element 1 (inside of metal cap 3), thereby preventing the atmosphere around thermistor element 1 from becoming an excessively reducing atmosphere and providing stable thermistor element resistance characteristics.

Next, mineral insulated cable 2, which is the essential component of the present invention, is made by repeating routinely performed drawing and annealing as previously described. As was previously mentioned, particle size distribution and so forth are suitably adjusted in advance to obtain the prescribed ventilation quantity. Mineral insulated cable 2 is then connected to thermistor element 1 by resistance welding or laser welding electrode wires 1b of sintered thermistor element 1 and core wires 2b.

In the present embodiment, however, the entire mineral insulated cable 2 is heat treated at 900° C. or higher to realize an even higher level of the above-mentioned ventilation quantity in mineral insulated cable 2. The basis for this is described based on an example of examining the relationship between the ventilation quantity in mineral insulated cable 2 and the resistance characteristics of the thermistor element.

The mineral insulated cable 2 employed the composition described in the previous example (outer diameter: 2.3 mm), and was heat-treated (oxidation treated) at 900° C. while assembled with thermistor element 1 and metal cap 3. The ventilation amount (ml/sec) when air (for example, industrial air) was allowed to flow at a pressure of 5 atmospheres from one side to the other side at normal temperature (approx. 25° C.) was converted to the quantity per 1 MPa (ml/(MPa·sec)).

FIG. 4 shows a graph of the relationship between oxidation treatment time (hr) and ventilation quantity (ml/(MPa·sec)). Oxidation treatment was performed for 0, 40 and 100 hours, and two measurements were made at each point in time. Furthermore, FIG. 4 also shows a comparative example in which the air inlet side of a mineral insulated cable oxidation treated at 900° C. for 100 hours was sealed with a sealing member to essentially prevent air flow.

As shown in FIG. 4, as a result of performing oxidation treatment, the above-mentioned ventilation quantity increased beyond $5 \times 10^{-4}$ (ml/(MPa·sec)) (equivalent to the value of the lower plot at 0 hr of oxidation treatment time in FIG. 4) at normal temperature, and the ventilation quantity increased with increases in oxidation treatment time.

The results of investigating the resistance characteristics of thermistor element 1 for each temperature sensor 100 in which the mineral insulated cable was oxidation treated for 0, 40 or 100 hr as described above are shown in FIG. 5. FIG. 5 is a graph showing the relationship between the number of cooling and heating cycles (horizontal axis) and the resistance rate of change (vertical axis: R rate of change, units: %) indicating the change from the initial resistance in thermistor element 1 while applying cooling and heating cycles from 25° C. to 900° C. to each temperature sensor 100.

In FIG. 5, the temperature sensor oxidation treated for 0 hr is represented with white and black squares, that oxidation treated for 40 hr with white and black triangles, and that oxidation treated for 100 hr with white and black circles. Furthermore, a temperature sensor using a the mineral insulated cable of the previously mentioned comparative example in which hardly any air was allowed to flow by sealing one end of mineral insulated cable 2 is represented with "x".

As shown in FIG. 4, a ventilation quantity of at least $1 \times 10^{-3}$ (ml/(MPa·sec)) was obtained at normal temperature for 40 hr of oxidation treatment, and a ventilation quantity of at least $5 \times 10^{-3}$ (ml/(MPa·sec)) was obtained at normal temperature for 100 hr of oxidation treatment.

As shown in FIG. 5, all of the temperature sensors of the present embodiment were practically useful (for example, resistance rate of change of within 5%). The resistance rate of change was favorably inhibited accompanying increases in oxidation treatment time, namely increases in ventilation quantity, and there was hardly any change in the resistance rate of change for oxidation treatment time of 100 hr in particular.

Thus, although stable thermistor element resistance characteristics are obtained even if mineral insulated cable 2 is not oxidation treated provided the above-mentioned prescribed ventilation quantity is achieved, it is preferable to achieve a ventilation quantity of $1 \times 10^{-3}$ (ml/(MPa·sec)) at normal temperature by performing oxidation treatment, and more preferable to achieve a ventilation quantity of $5 \times 10^{-3}$ (ml/(MPa·sec)) at normal temperature.

Furthermore, although mineral insulated cable 2 alone may be heat treated, it is preferable to heat treat the entire assembly by assembling thermistor 1 and metal cap 3 with said mineral insulated cable 2. This is to inhibit the formation of a reducing atmosphere that has a detrimental effect on resistance characteristics of the thermistor element under high temperatures by forming a stable oxide film on the inner surface of metal cap 3.

In this manner, according to the present embodiment, a ventilation composition can be realized that provides stable thermistor element resistance characteristics by achieving the above-mentioned prescribed ventilation quantity in mineral insulated cable 2 having an outer diameter of 3 mm or less. In particular, in the examination example shown in FIG. 5, stable thermistor element resistance characteristics were confirmed to be obtained provided the above-mentioned prescribed ventilation quantity is achieved for a narrower mineral insulated cable 2 having an outer diameter of 2.3 mm.

In addition, according to the present embodiment, since ventilation quantity is increased by heat treating mineral insulated cable 2, the above-mentioned prescribed ventilation quantity can be realized at a higher level. Moreover, the ventilation quantity inside lead wires 4 can be sufficiently achieved by using a composition having the above-mentioned gaps.

However, recently, in order to prevent the atmosphere around the thermistor element from becoming an excessively reducing atmosphere, studies have been conducted in the area of sealing the assembly structure by developing thermistor elements having stable characteristics when sealed with a heat-resistant metal tube that is resistant to the effects of ambient atmosphere, or by forming a stable oxide coating on the inside surface of a heat-resistant metal tube, or by filling the area around the thermistor with an inert substance, and some of these products are used in practice.

However, even when using the method described above, since sealed thermistors merely have a balanced raw material composition in terms of their characteristics, if there is variation in the composition, characteristics are correspondingly susceptible to fluctuation. In the present embodiment, a superior temperature sensor is realized in that it is able to stabilize the resistance characteristics of the thermistor element even with respect to a composition similar to that described above.

(Other Embodiments)

Furthermore, although the wiring member in the form of mineral insulated cable 2 employed a composition in which core wires 2b are insulated and held in the outer cylinder 2a by filling the inside of the outer cylinder 2a with insulating powder 2c between said outer cylinder 2a and core wires 2b, the wiring member is not limited to that having such a composition.

If the wiring member satisfies the two points of employing a composition in which electrically conducting core wires 2b connected to electrode wires 1b of a thermistor element are insulated and held in a metal outer cylinder 2a, and being able to achieve the above-mentioned prescribed ventilation quantity, the other sections may be composed in any way desired. For example, insulating fibers or a porous member may be used for the holding member that insulates and holds the core wires.

In addition, although thermistor element 1 is in the form of a so-called radial thermistor in which a pair of electrode wires 1b extend in the same direction from thermistor section 1b in the present embodiment, the pair of electrode wires may extend in mutually opposite directions, with one electrode wire connected to the wiring member and the other electrode wire connected to the metal cap, resulting in a so-called axial thermistor, and the present invention can also be applied to this so-called axial thermistor. In other words, the number of electrode wires may be any number desired, and the core wires of the wiring member correspond to the number of electrode wires.

In addition, the present invention may also be used in applications other than an exhaust temperature sensor. The present invention is particularly suited for use in a temperature sensor having an outer diameter of the temperature sensing section of 3 mm or less and featuring rapid response. In addition, it is also suited for use in a temperature sensor used over a temperature range up to about 1000° C. at which a reducing atmosphere tends to form easily around the thermistor element.

Since the essential component of the present invention is the ventilation composition of the wiring member, the design of the other sections may naturally be changed as required.

The present invention is not limited by or to the specific embodiments described which can undergo considerable variation without departing from the scope of the invention.

What is claimed is:

1. A temperature sensor equipped with:

a thermistor element having a thermistor section comprised of a thermistor material;

a wiring member comprising electrically conducting core wires, as first wires, coupled to said thermistor element, for acquiring thermistor signals from the thermistor element, insulated and held in a metal outer cylinder; and, a cylindrical metal case has an opening in one end and is closed on the other end, and is joined to said outer cylinder at said opening to form a blocked space in which space said thermistor element is housed; wherein, said wiring member secures a ventilation quantity in said outer cylinder of at least $5 \times 10^{-4}$ ml/(MPa sec) at normal temperature.

2. A temperature sensor according to claim 1, wherein the thermistor element has a thermistor section comprised of a thermistor material and electrode wires, as second wires, extending from said thermistor section for acquisition of thermistor signals, which electrode wires are connected to said core wires.

3. A temperature sensor according to claim 1, wherein a ventilation quantity of at least $1 \times 10^{-3}$ ml/(MPa·sec) is secured.

4. A temperature sensor according to claim 3, wherein a ventilation quantity of at least $5 \times 10^{-3}$ ml/(MPa·sec) is secured.

5. A temperature sensor according to claim 1, wherein an outer diameter of said outer cylinder is 3 mm or less.

6. A temperature sensor according to claim 5, wherein the outer diameter of said outer cylinder is 2.5 mm or less.

7. A temperature sensor according to claim 1, wherein said core wires are insulated and held in outer cylinder by filling a wiring member with insulating powder between said outer cylinder and said core wires within said outer cylinder, and said outer cylinder has a coefficient of thermal expansion at least $3 \times 10^{-6}$ (/°C.) larger than a coefficient of thermal expansion of said insulating powder.

8. A temperature sensor according to claim 7, wherein said insulating powder is composed essentially of magnesium oxide.

9. A temperature sensor according to claim 7, which comprises said wiring member of a temperature sensor heat oxidation treated at 900° C. or higher.

10. A temperature sensor according to claim 1, wherein lead wires, as third wires, for connecting with external circuitry are connected to said core wires at a site on the opposite side from the side at which said thermistor element is coupled to said wiring member;

the connection between said lead wires and said core wires is protected from the outside by protective members provided from the outside of said lead wires to the outside of said outer cylinder; and, said lead wires consist essential of a plurality of electrically conducting wires covered with flexible covering tubes.

11. A temperature sensor according to claim 1, wherein the thermistor material is an oxide semiconductor.

* * * * *